United States Patent
Benson et al.

(10) Patent No.: US 10,821,914 B2
(45) Date of Patent: Nov. 3, 2020

(54) ANGLED SLIDE IN RETAINING CLIP TOWER

(71) Applicant: TOYOTA MOTOR ENGINEERING & MANUFACTURING NORTH AMERICA, INC., Plano, TX (US)

(72) Inventors: James Collin Benson, North Canton, OH (US); Jarrod M. Daul, Ypsilanti, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 144 days.

(21) Appl. No.: 15/997,051

(22) Filed: Jun. 4, 2018

(65) Prior Publication Data
US 2019/0366943 A1 Dec. 5, 2019

(51) Int. Cl.
| | |
|---|---|
| *B60R 13/02* | (2006.01) |
| *F16B 17/00* | (2006.01) |
| *F16B 2/22* | (2006.01) |
| *F16B 2/24* | (2006.01) |

(52) U.S. Cl.
CPC .......... *B60R 13/0206* (2013.01); *F16B 2/22* (2013.01); *F16B 2/24* (2013.01); *F16B 17/00* (2013.01)

(58) Field of Classification Search
CPC .......... B60R 13/0206; F16B 2/22; F16B 2/24; F16B 17/00
See application file for complete search history.

(56) References Cited

U.S. PATENT DOCUMENTS

| | | | | |
|---|---|---|---|---|
| 5,507,610 | A * | 4/1996 | Benedetti | F16B 5/0628 24/297 |
| 6,715,185 | B2 * | 4/2004 | Angellotti | F16B 5/065 24/297 |
| 6,796,760 | B1 * | 9/2004 | Tanner | F16B 41/002 411/104 |
| 7,152,281 | B2 * | 12/2006 | Scroggie | B60R 13/0206 24/297 |
| 7,165,371 | B2 * | 1/2007 | Yoyasu | B60R 13/04 24/292 |
| 7,178,855 | B2 * | 2/2007 | Catron | B60J 5/0468 24/297 |
| 7,954,205 | B2 * | 6/2011 | Xueyong | B60R 13/0206 24/289 |
| 8,141,940 | B2 | 3/2012 | Ludwig et al. | |

(Continued)

FOREIGN PATENT DOCUMENTS

| | | |
|---|---|---|
| DE | 103 10 652 B3 | 5/2004 |
| EP | 2 199 630 B1 | 12/2015 |

(Continued)

*Primary Examiner* — Jason W San
(74) *Attorney, Agent, or Firm* — Oblon, McClelland, Maier & Neustadt, L.L.P.

(57) ABSTRACT

A retaining clip tower includes a locking feature with a circular opening for a clip stem to be inserted and a rectangular opening disposed below the circular opening that can allow for a lower flange of a clip to be inserted at an angle into the locking feature wherein that the clip can complete the angled slide in such that the entire clip sits level inside the locking feature with the lower flange disposed below the locking feature and such that the clip resists extraction against vertical and horizontal forces.

19 Claims, 5 Drawing Sheets

(56) References Cited

U.S. PATENT DOCUMENTS

| | | | |
|---|---|---|---|
| 8,177,466 B2* | 5/2012 | Csik | F16B 37/043 411/174 |
| 8,291,553 B2 | 10/2012 | Moberg | |
| 8,381,368 B2 | 2/2013 | Donahue-Yan et al. | |
| 8,671,528 B2* | 3/2014 | Hayashi | F16B 5/065 24/297 |
| 8,684,422 B2* | 4/2014 | Liang | G06F 1/1616 292/80 |
| 8,979,156 B2* | 3/2015 | Mally | F16B 5/0657 24/297 |
| 9,739,298 B2* | 8/2017 | Fellows | F16B 17/00 |
| 9,802,552 B2* | 10/2017 | Vega Velazquez | B60R 13/0206 |
| 9,938,997 B2* | 4/2018 | Iwahara | F16B 5/0657 |
| 10,017,130 B2* | 7/2018 | Knieper | B60R 13/0206 |
| 10,125,804 B2* | 11/2018 | Krippl | F16B 5/0657 |
| 10,302,109 B2* | 5/2019 | Michelini | F16B 5/0664 |
| 2001/0042273 A1* | 11/2001 | Chaffee | A44B 11/2584 5/655.3 |
| 2007/0107174 A1* | 5/2007 | Bordas | B60R 13/0206 24/664 |
| 2009/0199371 A1* | 8/2009 | Katoh | F16B 5/0628 24/458 |
| 2009/0249587 A1* | 10/2009 | Donahue-Yan | B60R 13/0206 24/297 |
| 2013/0057009 A1* | 3/2013 | Turicik | B60R 13/0206 296/1.08 |
| 2015/0283957 A1* | 10/2015 | Dickinson | F16B 5/123 24/303 |
| 2016/0176363 A1* | 6/2016 | Bachelder | B60R 13/0206 24/292 |
| 2016/0368433 A1 | 12/2016 | Vega Velazquez et al. | |
| 2017/0028939 A1* | 2/2017 | Takahashi | B60R 13/04 |
| 2017/0050584 A1* | 2/2017 | Knieper | B60R 13/0206 |

FOREIGN PATENT DOCUMENTS

| | | |
|---|---|---|
| JP | 4105887 B2 | 6/2008 |
| JP | 4146547 B2 | 9/2008 |
| JP | 5949283 B2 | 7/2016 |

* cited by examiner

ANGLED SLIDE IN RETAINING CLIP TOWER

FIELD OF THE DISCLOSURE

This specification relates generally to a clip tower for automobile door trims.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Clips and clip towers employed by manufacturers, for example automobile manufacturers, for fastening trim panels to automobile support structures may allow for clips installed into the towers to come loose during packaging, transport, and assembly. This occurs when packaging is too tight to fit the trim panel and the clips either snag upon being inserted or extracted from the packaging, where accidental lateral extraction forces are greater than the retention force of the clip tower holding the clip. Previously, steps have been taken to adjust the tower design to increase the required lateral force to extract the clip. Sometimes this also requires increasing the force a user must exert to install the clips. However, a design that prevents this phenomenon features a locking mechanism that does not allow for any accidental lateral extraction and does not increase the required user force for clip installation.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

According to various aspects of the disclosed subject matter, a retaining clip tower is presented including a design with a circular opening for a clip stem to be inserted and a rectangular opening disposed below the circular opening that can allow for a lower flange of a clip to be inserted at an angle into the clip tower. After installation, when lateral force is applied in any direction, the clip cannot achieve the angle required to extract the clip and it remains within the clip tower.

BRIEF DESCRIPTION OF THE DRAWINGS

A more complete appreciation of the disclosed embodiments and many of the attendant advantages thereof will be readily obtained as the same becomes better understood by reference to the following detailed description when considered in connection with the accompanying drawings, wherein.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details.

It is to be understood that terms such as "first," "second," "upper," "lower," "above," "below," "side," and the like that may be used herein merely describe points of reference and do not necessarily limit embodiments of the present disclosure to any particular orientation or configuration.

The present disclosure has utility as clip towers and clips are widely used by automobile manufacturers to attach trim panels to an automobile support structure, where the trim panels are used to cover the metal structural components of the automobile body. The clip towers can be molded into or attached to the trim panel on a side opposite to the side facing the interior cabin of the vehicle upon final assembly. This produces a trim that will be aesthetically pleasing since the clips and clip towers will not be visible to the passengers. The clips are already inserted into the clip towers of the manufactured trim panel prior to packaging and transported to a predetermined location for assembly. The panel is removed from the packaging and aligned to the automobile support structure where small holes are located for the clips to fasten into, thereby securing the trim panel to the automobile support structure.

Figure 1:
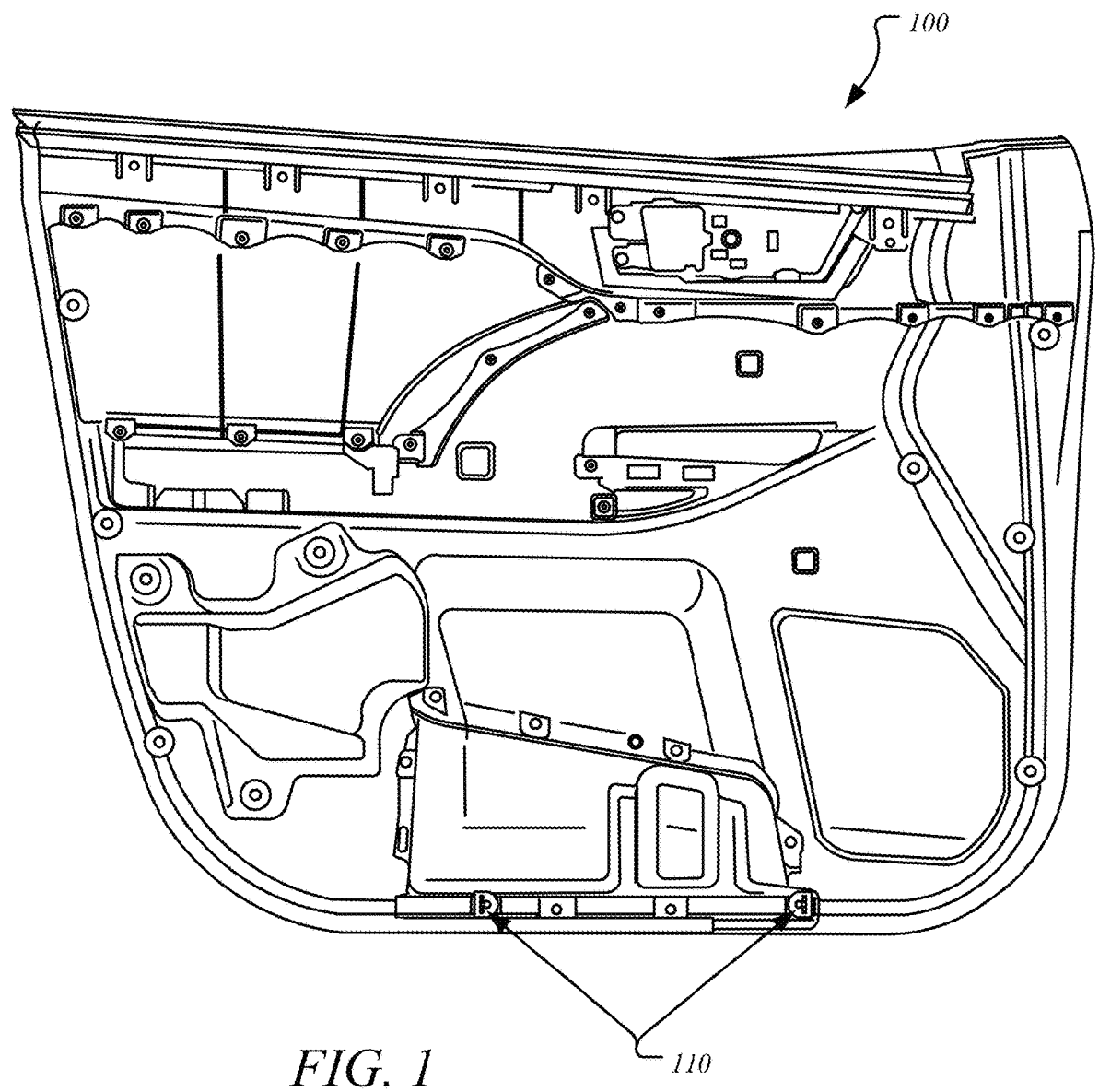
FIG. 1 is an illustration of a vehicle trim panel with incorporated clip towers according to one or more aspects of the disclosed subject matter.

FIG. 1 illustrates a vehicle door trim panel 100 (herein referred to as trim panel 100) with a view of an exterior side (facing the exterior of the automobile) that will be fastened to the automobile support structure. The trim panel 100 can be made of a thermoplastic material such that it can be fabricated using, for example, injection or transfer molding. The trim panel 100 includes at least one clip towers 110 that can be attached to various trim panel 100 components that are attached to the trim panel 100. For example, the at least one clip towers can be fastened onto the trim panel 100 or components via a chemical adhesive. Alternatively, the at least one clip towers 110 can be attached directly to the trim panel 100 during the trim panel 100 manufacturing process. For example, the at least one clip towers 110 can be molded directly to the trim panel 100.

Figure 2:
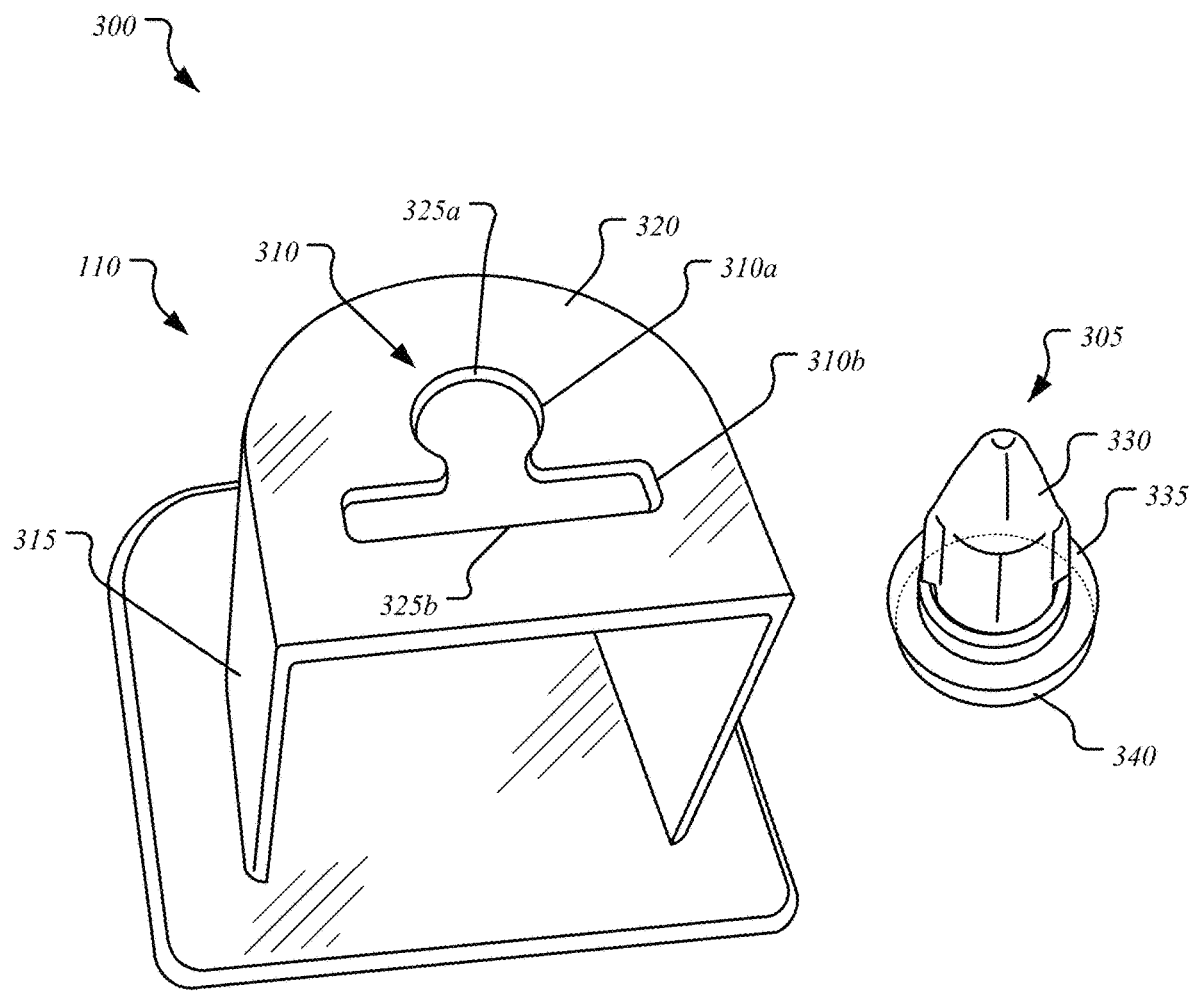
FIG. 2 is an illustration of a clip tower with locking feature and dip according to one or more aspects of the disclosed subject matter.
Figure 3:
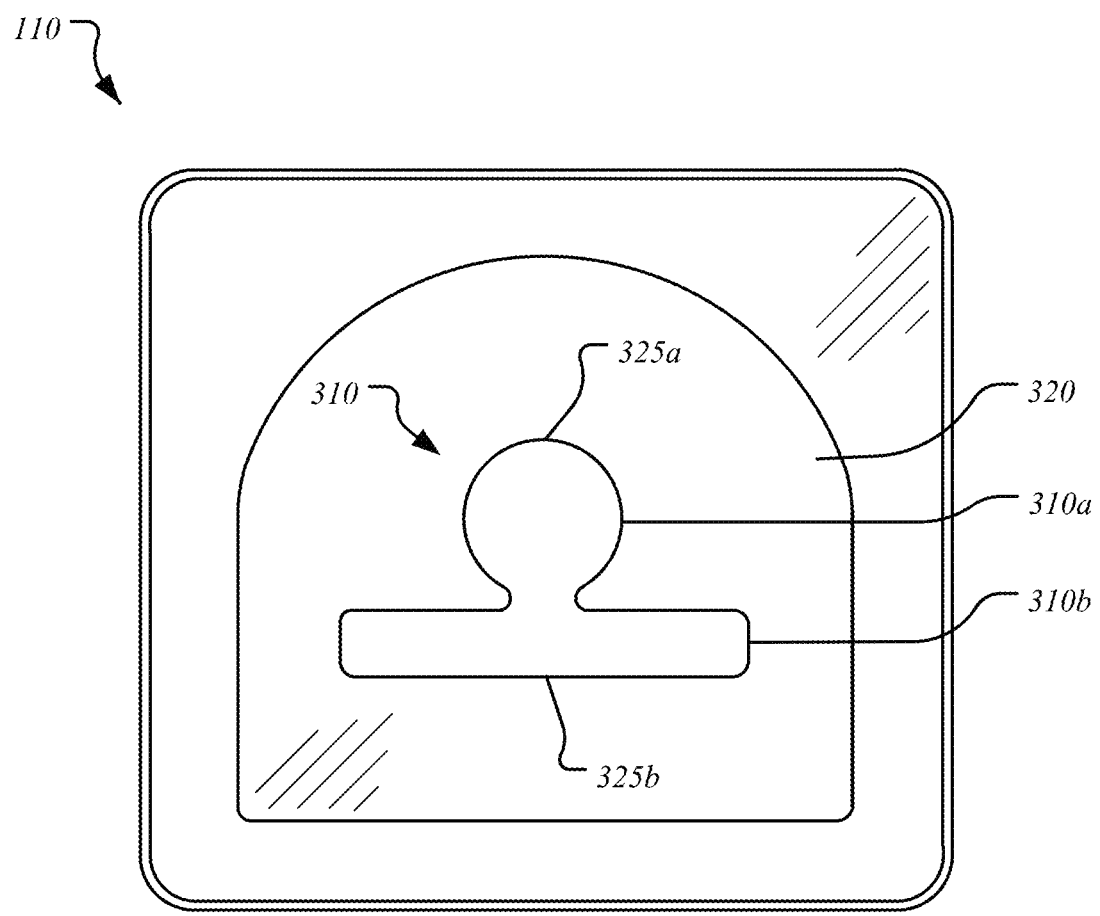
FIG. 3 is a top-down illustration of a clip tower with locking feature according to one or more aspects of the disclosed subject matter.

FIG. 2 and FIG. 3 illustrate components of the passive semi-permanent clip locking system 300 including the clip tower 110 and a clip 305. In order to secure the clip 305 into the clip tower 110, a locking feature 310 is incorporated into the clip tower 110 and prevents accidental lateral egress of the clip 305. For example, the locking feature 310 can prevent lateral forces pulling the clip 305 loose from the clip tower 110 due to lateral forces when inserting and removing a panel (e.g., the trim panel 100) from packaging.

In one embodiment, the at least one clip tower 110 can be attached to the trim panel 100 component, for example via a chemical adhesive. The clip tower 110 can include an outer periphery and an interior space. The outer periphery is defined by a vertical body 315, an upper surface 320, and the locking feature 310. The vertical body 315 is attached to the trim panel 100 component that can be attached to the trim panel 100. Alternatively, the vertical body 315 can be directly molded into the trim panel 100. The upper surface 320 can be molded to a predetermined shape. For example, in FIG. 2 the upper surface 320 adopts a rounded arch shape, but can adopt another shape in other embodiments, such as a rectangle, square, or triangle. The locking feature 310 can be a volume of clip tower 110 material removed from the upper surface 320 that is attached to the vertical body 315. The volume of material removed to form the locking feature 310 can be of a predetermined shape and open into the interior space of the clip tower 110. For example, the volume of material removed can form a first opening 310a that is substantially circular and a second opening 310b that is substantially rectangular. The shape of the first opening 310a that is substantially circular can be, for example, triangular, square, pentagonal, hexagonal, heptagonal, octagonal, or circular (as shown), and the shape of the second opening 310b that is substantially rectangular can be, for example, square, trapezoidal, pentagonal, or rectangular (as shown). The first opening 310a and second opening 310b can be connected such that no upper surface 320 material separates the openings (that is, a contiguous opening is formed). In an alternative embodiment, the volume of material removed can form an Arc shape, wherein the Arc shape includes a first opening 310a being substantially circular and a second opening 310b being substantially rectangular and the Arc shape can be symmetric about an axis through both the first opening 310a and the second opening 310b. The shape of the first opening 310a that is substantially circular can also be, for example, triangular, square, pentagonal, hexagonal, heptagonal, or octagonal, and the shape of the second opening 310b that is substantially rectangular can be, for example, square, trapezoidal, or pentagonal. The locking feature 310 can be oriented, for example, such that an edge of the rectangular second opening 310b is parallel to an edge of the upper surface 320. The orientation of the upper surface 320 can be manufactured such that the plane of the upper surface 320 is parallel or near-parallel with respect to the trim panel 100 to which it is attached, or any angle in order to allow optimal fastening of the clip 305 to the automobile support structure.

Figure 4A:
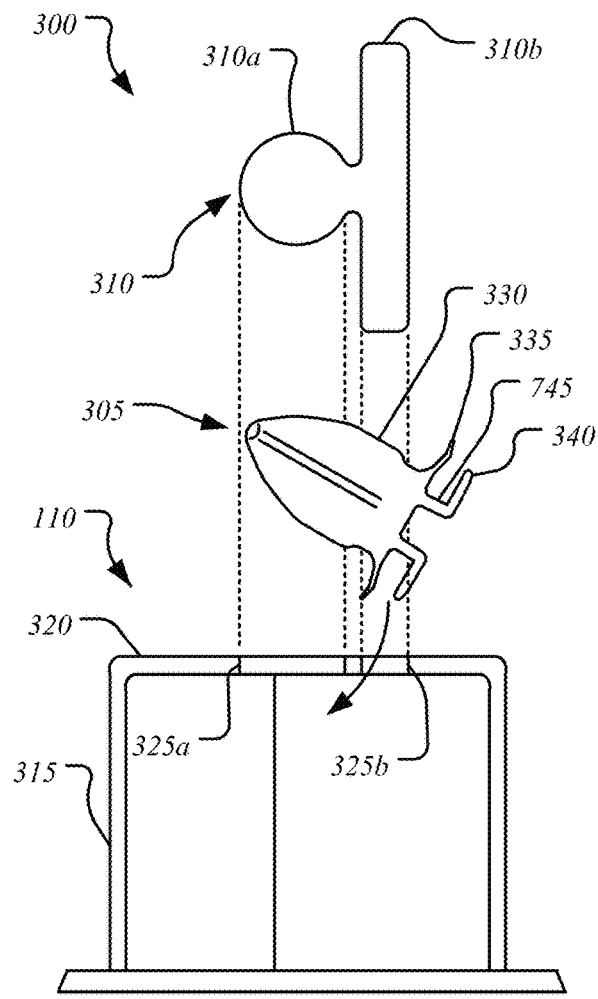
FIG. 4A is a side-view cross sectional illustration of a clip being installed in a clip tower at an angle according to one or more aspects of the disclosed subject matter.
Figure 4B:
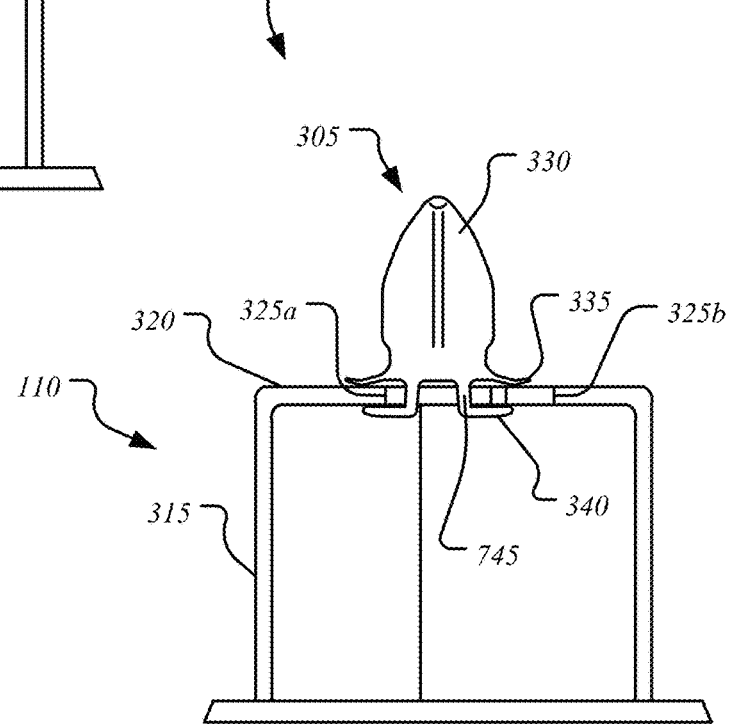
FIG. 4B is a side-view cross sectional illustration of a clip installed in a clip tower according to one or more aspects of the disclosed subject flatter.

The design of the clip 305 can include a clip head 330, an upper flange 335, a lower flange 340, and a stem 745 (visible in FIGS. 4A and 4B). The diameter of the upper flange 335 can be wider than that of the diameter of the first opening 310a, the diameter of the lower flange 340 can be narrower than that of the width of the second opening 310b, and the diameter of the stem 745 can be narrower than that of the diameter of the first opening 310a, preferably narrower than the opening at the junction between the first opening 310a and second opening 310b. The head 330 can be wide enough such that it can be inserted, with minor deformation, into holes in the automobile support structure in order to fasten the clip 305 and clip tower 110, and thereby the trim panel 100, to the automobile support structure.

Non-limiting examples of appropriate materials for the clip and clip tower include materials that can be injection molded or stamped, such as acrylonitrile butadiene styrene, acetal, polyethylene, polycarbonate, polyamide, high impact polystyrene, aluminium, brass, copper, steel, tin, nickel and titanium, or preferably, polypropylene. A clip tower can have a width of 20 mm to 40 mm, a height of 20 mm to 40 mm, a depth of 20 mm to 40 mm, and a wall thickness of 1 mm to 3 mm, or preferably, 30 mm wide by 27.5 mm tall by 30 mm deep with a wall thickness of 2 mm.

FIG. 4A illustrates an angled slide-in of the clip 305 into the locking feature 310 of the clip tower 110 via a side-view cross section. The clip 305 can be inserted into the locking feature 310 at an angle, for example at 30 to 80 degrees, or 40 to 70 degrees, or 45 to 70 degrees. The slide-in angle can be measured as the angle between the horizontal plane through the upper flange 335 relative to the angle of the horizontal plane along the upper surface 320. In this manner, as the clip 305 is inserted, the lower flange 340 is the first part of the clip 305 to enter the locking feature 310 at the second opening 310b. The upper flange 335 remains above the upper surface 320 and can slightly deform upon contact of the upper flange 335 on the upper surface 320 during slide-in of the clip 305. The stem 745 can pass through into the first opening 310a and come to a stop when it contacts a first opening sidewall 325a. After contacting the first opening sidewall 325a, the lower flange 340 can move past a second opening sidewall 325b with or without deformation of the lower flange 340 upon contact with the upper surface 320, and the clip 305 can complete the angled slide-in such that the entire clip 305 sits inside the locking feature 310 as shown in FIG. 4B. Notably, since the diameter of the stem 745 is narrower than the first opening 310a, there is room for adjustment of the clip 305 during installation of the trim panel 100 into the automobile support structure.

In another embodiment, the width of the stem 745 is slightly wider than the width of the opening at the junction between the first opening 310a and second opening 310b, for example wider by 0.5 to 10%. During the angled slide-in, resistance will be felt when the stem meets the narrower opening and additional force from a user can be used to deform the stem 745 or the opening in order to progress the stem 745 through to the first opening 310a.

Figure 5:
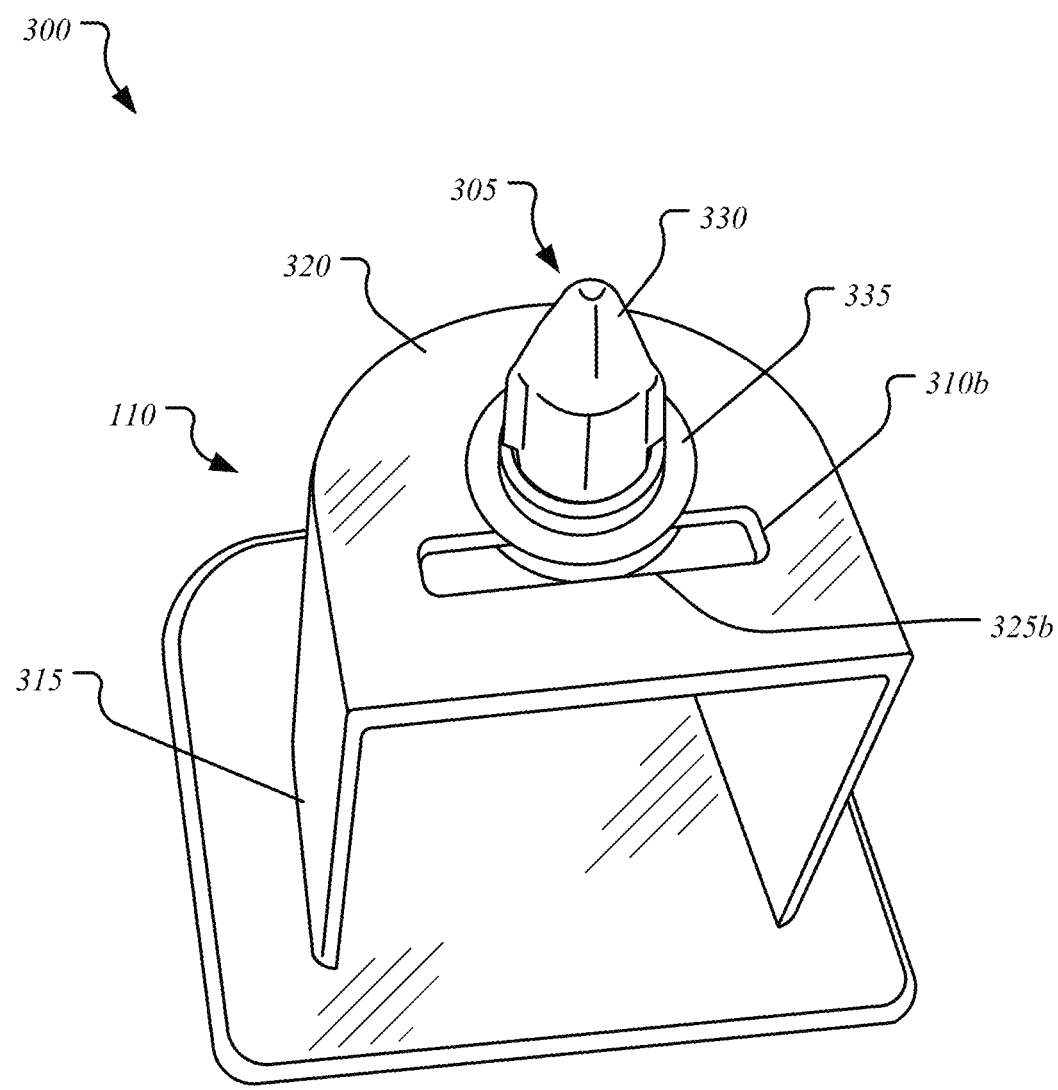
FIG. 5 is a perspective illustration of a clip installed in a clip tower with locking feature according to one or more aspects of the disclosed subject matter.

FIG. 5 illustrates the orientation of the clip 305 after installation. The upper flange 335 can be disposed above the upper surface 320 while the lower flange 340 can be disposed below the upper surface 320, and the clip is disposed in an at least substantially centered position inside the first opening 310a.

Advantageously, in this orientation, the clip 305 can remain locked inside the locking feature 310 of the clip tower 110 against any vertical or horizontal forces. In the event of an upward vertical force, the lower flange 340 can push against the upper surface 320 to secure the clip 305 in the locking feature 310. In the event of a horizontal or lateral force, for example from a packaging bag snagging on the clip head 330, the stem 745 can push against either the first opening sidewall 325a or the second opening sidewall 325b to secure the clip 305 in the locking feature 310.

Notably, the clip 305 can be installed and extracted from the locking feature 310 using a small amount of force, for example 5 N, if manipulated at the correct angle. This advantage can help alleviate fatigue in users' hands when multiple clips 305 must be repetitively installed into locking features 310 of clip towers 110, for example in an assembly line setting. For manufacturers that utilize clips 305 and clip towers 110, the simple design of the locking feature 310 can allow for facile adjustment of dimensions of the locking feature 310 in order to conform to other clip 305 and clip tower 110 structures already in use by said manufacturer.

Moreover, this simple design allows for rapid manufacturing and testing of prototypes using additive manufacturing techniques, such as 3D printing, whereas other locking designs may require a mold to be made first before a prototype can be produced.

Also notably, the locking feature 310 design for the passive semi-permanent clip locking system 300 can be used in other applications where the clip 305 and clip tower 110 are needed to secure two pieces of material together while retaining an aesthetic appearance such that fastening devices are not visible. These applications could include, for example, casings for electronic devices such as televisions, computers, speakers, etc. or construction materials such as wall paneling, etc.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosure. The accompanying claims and their equivalents are intended to cover such forms or modifications as would fall within the scope and spirit of the present disclosure.

What is claimed is:

1. A clip locking system, comprising:
   a clip tower including an outer periphery and an interior space, wherein:
      the outer periphery is defined by a vertical body, an upper surface, and a locking feature;
      the upper surface of the clip tower includes the locking feature, the locking feature being disposed in a plane of the upper surface and within an outer boundary of the upper surface defined by the vertical body, the upper surface surrounding an entirety of the locking feature;
      the locking feature opens into the interior space of the clip tower; and
      the locking feature includes a first opening being substantially circular and a second opening being substantially rectangular; and
   a clip including a lower flange, an upper flange, a stem connecting the lower flange to the upper flange, and a head connected to the upper flange, wherein:
      a diameter of the lower flange is narrower than the width of the second opening; and
      after inserting the clip into the clip tower, the lower flange is disposed below the upper surface and inside the interior space, and the stem is disposed in the locking feature.

2. The clip locking system of claim 1, wherein the locking feature is configured to receive the clip at an angle between 40 and 70 degrees.

3. The clip locking system of claim 2, wherein the locking feature allows the clip to be inserted at an angle with a required force that is less than 5 N.

4. The clip locking system of claim 1, wherein the locking feature is configured to allow extraction of the clip when manipulated to egress at an angle between 40 and 70 degrees.

5. The clip locking system of claim 4, wherein the locking feature allows the clip to be extracted at an angle with a required force that is less than 5 N.

6. The clip locking system of claim 1, wherein a material of the clip includes at least one of acrylonitrile butadiene styrene, acetal, polyethylene, polycarbonate, polyamide, high impact polystyrene, aluminium, brass, copper, steel, tin, nickel and titanium, or preferably, polypropylene.

7. The clip locking system of claim 1, wherein a material of the clip tower includes at least one of acrylonitrile butadiene styrene, acetal, polyethylene, polycarbonate, polyamide, high impact polystyrene, aluminium, brass, copper, steel, tin, nickel and titanium, or preferably, polypropylene.

8. The clip locking system of claim 1, wherein:
   the clip tower is directly attached to a trim panel exterior surface; and
   the clip is inserted into the locking feature of the clip tower and configured to fasten to an automobile support structure.

9. The clip locking system of claim 1, wherein:
   the clip tower is attached to a trim panel component that is attached to a trim panel exterior surface; and
   the clip is inserted into the locking feature of the clip tower and configured to fasten to an automobile support structure.

10. The clip locking system of claim 1, wherein the first and second opening form a symmetric shape.

11. The clip locking system of claim 10, wherein the smallest width of the first opening is narrower than the width of the upper flange of the clip.

12. The clip locking system of claim 10, wherein the first opening and the second opening are contiguous.

13. A method of clip locking, comprising:
   attaching a clip tower of a clip tower system to a trim panel, the clip tower including an outer periphery and an interior space, the outer periphery being defined by a vertical body, an upper surface, and a locking feature, the upper surface of the clip tower including the locking feature, the locking feature being disposed in a plane of the upper surface and within an outer boundary of the upper surface defined by the vertical body, the upper surface surrounding an entirety of the locking feature, the locking feature opening into the interior space of the clip tower; and the locking feature including a first opening being substantially circular and a second opening being substantially rectangular; and
   inserting a clip into the locking feature of the clip tower at an angle, the clip including a lower flange, an upper flange, a stem connecting the lower flange to the upper flange, and a head connected to the upper flange, a diameter of the lower flange being narrower than the width of the second opening, and after inserting the clip into the clip tower, the lower flange is disposed below the upper surface and inside the interior space and the stem is disposed in the locking feature.

14. The method of claim 13, further comprising attaching the trim panel to an automobile support structure via the clip secured in the locking feature of the clip tower.

15. The method of claim 13, further comprising extracting the clip from the locking feature of the clip tower when manipulated to egress at an angle between 40 and 70 degrees.

16. A clip tower, comprising:
   an outer periphery and an interior space, wherein:
      the outer periphery is defined by a vertical body, an upper surface, and a locking feature;
      the upper surface of the clip tower includes the locking feature, the locking feature being disposed in a plane of the upper surface and within an outer boundary of the upper surface defined by the vertical body, the upper surface surrounding an entirety of the locking feature;

the locking feature opens into the interior space of the clip tower;

the locking feature includes a first opening being substantially circular and a second opening being substantially rectangular, wherein the second opening is configured to receive a flange that is narrower than the width of the second opening.

17. The clip tower of claim 16, wherein the locking feature is configured to receive a clip at an angle between 40 and 70 degrees.

18. The clip tower of claim 16, wherein the locking feature is configured to allow extraction of a clip when manipulated to egress at an angle between 40 and 70 degrees.

19. The clip tower of claim 16, wherein the first and second opening form a symmetric shape.

* * * * *